(12) United States Patent
Xiong

(10) Patent No.: US 10,452,701 B2
(45) Date of Patent: Oct. 22, 2019

(54) PREDICTING A LEVEL OF KNOWLEDGE THAT A USER OF AN ONLINE SYSTEM HAS ABOUT A TOPIC ASSOCIATED WITH A SET OF CONTENT ITEMS MAINTAINED IN THE ONLINE SYSTEM

(71) Applicant: Facebook, Inc., Menlo Park, CA (US)

(72) Inventor: Hongzheng Xiong, London (GB)

(73) Assignee: Facebook, Inc., Menlo Park, CA (US)

( * ) Notice: Subject to any disclaimer, the term of this patent is extended or adjusted under 35 U.S.C. 154(b) by 162 days.

(21) Appl. No.: 15/808,168

(22) Filed: Nov. 9, 2017

(65) Prior Publication Data

US 2019/0138651 A1   May 9, 2019

(51) Int. Cl.
   *G06F 16/35*   (2019.01)
   *G06Q 30/02*   (2012.01)
   *G06N 20/00*   (2019.01)

(52) U.S. Cl.
   CPC ....... *G06F 16/353* (2019.01); *G06Q 30/0277* (2013.01); *G06N 20/00* (2019.01)

(58) Field of Classification Search
   CPC ... G06F 16/353; G06Q 30/0277; G06N 20/00
   USPC ........................................................ 707/738
   See application file for complete search history.

(56) References Cited

U.S. PATENT DOCUMENTS

| | | | |
|---|---|---|---|
| 8,484,194 B1 * | 7/2013 | Juang | G06F 16/353 707/710 |
| 9,461,876 B2 * | 10/2016 | Van Dusen | H04L 41/04 |
| 2003/0084066 A1 * | 5/2003 | Waterman | G06F 16/38 |
| 2012/0066073 A1 * | 3/2012 | Dilip | G06Q 30/0269 705/14.66 |
| 2015/0088644 A1 * | 3/2015 | Shay | G06Q 30/0254 705/14.52 |
| 2016/0034956 A1 * | 2/2016 | Rajaram | G06Q 30/0256 705/14.54 |
| 2016/0071153 A1 * | 3/2016 | Simo | G06Q 30/0257 705/14.55 |

(Continued)

OTHER PUBLICATIONS

Wang, G. Alan, et al., "ExpertRank: A topic-aware expert finding algorithm for online knowledge communities", Decision Support Systems, vol. 54, Issue 3, Feb. 2013, pp. 1442-1451.*

(Continued)

*Primary Examiner* — Robert Stevens
(74) *Attorney, Agent, or Firm* — Fenwick & West LLP

(57) ABSTRACT

An online system generates a hierarchical taxonomy including multiple levels arranged in order of increasing specificity, in which each level includes one or more topics with which a content item maintained in the online system may be associated. Based on information associated with presentations of content items to online system users, which may indicate the users' familiarity with the content items, the online system predicts a likelihood that a particular user is familiar with information associated with one or more content items associated with a topic. Based at least in part on the predicted likelihood, the online system generates a connection between the user and the topic, in which the connection corresponds to a predicted level of knowledge that the user has about the topic. The online system may later retrieve the user's predicted level of knowledge about the topic (e.g., to select content for presentation to the user).

25 Claims, 4 Drawing Sheets

(56) References Cited

U.S. PATENT DOCUMENTS

2016/0247204 A1* 8/2016 Amiri .................. G06F 16/958
2018/0314756 A1* 11/2018 Wang .................... G06Q 50/01

OTHER PUBLICATIONS

Al-Kouz, Akram, et al., "Latent Semantic Social Graph Model for Expert Discovery in Facebook", 11th International Conf. on Innovative Internet Community Systems (I2CS 2011), Berlin, Germany, Jun. 15-17, 2011, 11 pages.*

Cameron, Delroy, et al., "A Taxonomy-based Model for Expertise Extrapolation", ICSC 2010, Pittsburgh, PA, Sep. 22-24, 2010, pp. 333-340.*

Song, Xiaodan, et al., "ExpertiseNet: Relational and Evolutionary Expert Modeling", UM 2005, LNAI 3538, Springer-Verlag, Berlin, Germany, © 2005, pp. 99-108.*

Dom, Byron, et al., "Graph-Based Ranking Algorithms for E-mail Expertise Analysis", DMKD '03, San Diego, CA, Jun. 13, 2003, pp. 42-48.*

Kapanipathi, Pavan, et al., "User Interests Identification on Twitter Using a Hierarchical Knowledge Base", ESWC 2014, Anissaras, Greece, May 25-29, 2014, pp. 99-113.*

Afzal, Muhammad Tanvir, et al., "Discovery and Visualization of Expertise in a Scientific Community", FIT '09, Abbottabad, Pakistan, Dec. 16-18, 2009, 6 pages.*

* cited by examiner

PREDICTING A LEVEL OF KNOWLEDGE THAT A USER OF AN ONLINE SYSTEM HAS ABOUT A TOPIC ASSOCIATED WITH A SET OF CONTENT ITEMS MAINTAINED IN THE ONLINE SYSTEM

BACKGROUND

This disclosure relates generally to online systems, and more specifically to predicting a level of knowledge that a user of an online system has about a topic associated with a set of content items maintained in the online system.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for content-providing users to share content by creating content items (e.g., advertisements) for presentation to additional online system users. For example, content-providing users may share photos or videos they have uploaded by creating content items that include the photos or videos that are presented to additional users to whom they are connected in the online system. By allowing content-providing users to create content items for presentation to additional online system users, an online system also provides abundant opportunities to persuade online system users to take various actions and/or to increase awareness about products, services, opinions, or causes among online system users. For example, if a content-providing user of the online system who volunteers for a non-profit organization creates a content item encouraging additional online system users to volunteer for the non-profit organization, the online system may present the content item to these additional online system users.

Conventionally, online systems generate revenue by displaying content to their users. For example, an online system may charge advertisers for each presentation of an advertisement to an online system user (i.e., each "impression") or for each interaction with an advertisement by an online system user (e.g., each click on the advertisement, each purchase made as a result of clicking through the advertisement, etc.). Furthermore, by presenting content that encourages user engagement with online systems, online systems may increase the number of opportunities they have to generate revenue. For example, if an online system user scrolls through a newsfeed to view content that captures the user's interest, advertisements that are interspersed in the newsfeed also may be presented to the user.

To present content that encourages user engagement with online systems, online systems may select content items for presentation to online system users that are likely to be relevant to the users. Online systems may do so by selecting the content items based on targeting criteria associated with the content items that identify online system users who are likely to have an interest in the content items. For example, a content item maintained in the online system for bakeware may be associated with targeting criteria that identify online system users who have expressed an interest in baking (e.g., users whose user profiles indicate that the users' hobbies include baking, users whose profiles indicate that the users' occupations are related to baking, users who previously interacted with content items associated with baking, etc.). In this example, upon identifying an opportunity to present a content item to a user of the online system, the online system may select the content item for presentation to the user if attributes for the user satisfy one or more targeting criteria associated with the content item.

However, a content item that is associated with targeting criteria satisfied by users of the online system may have varying degrees of relevance to the users based on the users' knowledge about one or more topics associated with the content item. For example, online system users who have recently taken up jewelry making are more likely to have an interest in supplies required for basic jewelry-making techniques (e.g., glass beads, wire, pliers, etc.) than in supplies required for advanced jewelry-making techniques (e.g., gemstones, solder, blow torches, etc.) while the opposite is likely to be true for online system users who have been making jewelry for several years. In this example, suppose that a content-providing user of the online system has created a first content item associated with supplies required for basic jewelry-making techniques and a second content item associated with supplies required for advanced jewelry-making techniques and has associated both content items with targeting criteria that identify online system users who have expressed an interest in jewelry making. In the above example, even though the first content item and the second content item are likely to be relevant to different online system users based on their level of knowledge about the topic of jewelry making, the online system may be unable to identify these users, rendering the content-providing user unable to associate more specific targeting criteria with the content items that would allow the online system to target the presentation of the content items to the users based on their level of knowledge about jewelry making. Therefore, online systems may waste opportunities to present content items to the online system users that are more likely to be relevant to the users based on their level of knowledge about various topics associated with the content items.

SUMMARY

An online system maintains content items (e.g., advertisements) received from content-providing users of the online system (e.g., advertisers) for presentation to additional users of the online system. Each content item maintained in the online system may be associated with one or more topics. Examples of topics that may be associated with a content item include a name or other identifier associated with a content-providing user from whom the content item was received, a type of product or service associated with the content item, a subject of a story being told in the content item, a keyword included in a title of the content item, etc. For example, suppose that a content-providing user of the online system is an entity that manufactures a certain brand of electric car and that the online system receives a content item from the content-providing user that is an advertisement for electric cars of that brand. In this example, the advertisement may be associated with topics including cars, electric cars, and the name of the brand. In some embodiments, topics associated with one or more content items may have a hierarchical relationship, such that the topics may be arranged in order of increasing specificity. In the above example, since an electric car is a type of car, the topic of electric cars may be a more specific topic (i.e., a subtopic) within the topic of cars. Furthermore, in the above example, since an electric car of the brand is a type of electric car, the name of the brand may be a subtopic within the topic of electric cars.

Content items may be associated with topics that are assigned to them. In some embodiments, topics may be assigned to content items by content-providing users of the online system from whom the content items were received. For example, a content item may be associated with metadata indicating topics associated with the content item that were assigned to the content item by a content-providing user of the online system from whom the content item was received. Topics also may be assigned to content items by the online system. In some embodiments, the online system may identify topics associated with content items by reviewing the content of the content items and/or metadata associated with the content items and assigning the identified topics to the content items. For example, by reviewing the text and images included in a content item and/or by performing a search of metadata associated with the images for various anchor terms, the online system may identify one or more topics associated with the content item and assign them to the content item.

In some embodiments, the online system also may assign topics to a content item using a machine-learning model. In such embodiments, the online system may train the machine-learning model based on information associated with content items to which topics have been assigned. Examples of such information include information associated with content-providing users of the online system from whom the content items were received, targeting criteria associated with the content items identifying attributes for online system users eligible to be presented with the content items, attributes for online system users presented with the content items who interacted with the content items, attributes for online system users presented with the content items who did not interact with the content items, metadata associated with the content items, etc. For example, the online system may train a model based on information associated with content items to which various topics have been assigned, such as information identifying industries or organizations associated with content-providing users of the online system from whom the content items were received and information included in targeting criteria associated with the content items describing hobbies, interests, and demographic information that may be associated with online system users. In embodiments in which the online system assigns one or more topics to a content item, the online system may store information describing the assignments (e.g., in association with the content item).

The online system may generate one or more hierarchical taxonomies based on topics associated with content items maintained in the online system. A hierarchical taxonomy may include multiple levels arranged in order of increasing specificity and each level of the hierarchical taxonomy may include one or more topics with which a content item may be associated. Furthermore, each topic within a hierarchical taxonomy may include a set of more specific subtopics within a more specific level of the hierarchical taxonomy. In some embodiments, a hierarchical taxonomy may be represented as a collection of nodes, in which each topic included in the hierarchical taxonomy corresponds to a node. For example, if the online system generates a hierarchical taxonomy based on topics associated with content items maintained in the online system related to magazines, a highest level of the hierarchical taxonomy may include a node corresponding to a broadest topic that may be associated with the content items (e.g., magazines). In this example, the broadest topic may include a set of subtopics corresponding to nodes within a lower level of the hierarchical taxonomy, in which each subtopic may be associated with a more specific type of magazine (e.g., fashion magazines, news magazines, sports magazines, home/garden magazines, music/entertainment magazines, etc.). Continuing with this example, each subtopic also may include a set of even more specific subtopics corresponding to nodes within an even lower level of the hierarchical taxonomy, in which each subtopic may be associated with even more specific types of magazines (e.g., types of fashion magazines, types of news magazines, types of sports magazines, types of home/garden magazines, types of music/entertainment magazines, etc.). Once the online system has generated a hierarchical taxonomy, the online system subsequently may add more topics/nodes to the hierarchical taxonomy. For example, upon receiving one or more content items associated with topics that are related to, but not included in a hierarchical taxonomy, the online system may add a node corresponding to each topic to one or more levels of the hierarchical taxonomy.

Upon presenting content items to users of the online system, the online system may store information associated with each presentation of a content item to an online system user. Information associated with the presentation of a content item to an online system user may describe a type of interaction with the content item by the user (e.g., clicking on the content item, sharing the content item with additional online system users, expressing a preference for the content item, commenting on the content item, etc.), attributes for the user (e.g., demographic information, hobbies/interests, or any other types of information stored in association with a user profile of the user), one or more topics associated with the content item, a date/time of the presentation, etc. For example, upon presenting a content item to a user of the online system, the online system may receive information indicating that the user clicked on the content item, user-identifying information for the user (e.g., a username or an IP address associated with the user), information identifying the content item (e.g., an identification number or other unique identifier associated with the content item), and a date and a time that the user clicked on the content item. In this example, the online system may retrieve one or more topics associated with the content item based on the information identifying the content item and one or more attributes for the user based on the user-identifying information. Continuing with this example, the online system may store the information indicating that the user clicked on the content item, the user-identifying information for the user, the information identifying the content item, and the date and the time that the user clicked on the content item in association with the topics associated with the content item and the attributes for the user (e.g., as a record in a table).

Once the online system has presented content items to users of the online system, the online system subsequently may receive information indicating the users' familiarity with the content items. In some embodiments, the online system may receive this information in response to a request for information communicated to the users by the online system (e.g., in the form of a questionnaire or a survey). For example, if the online system presents a particular content item to a user of the online system, the online system may send a questionnaire to the user one week later asking the user whether they recall being presented with the content item one week ago and whether the user recalls various details associated with the content item (e.g., its content, a call to action associated with the content item, etc.). Upon receiving information indicating a user's familiarity with a content item previously presented to the user, the online system may store this information as well, such that it is included among the information associated with the presentation of the content item.

Based on the information associated with the presentation of content items to various online system users and on attributes for additional users of the online system, the online system may predict likelihoods that these additional online system users are familiar with information associated with the same or similar content items. In some embodiments, the online system may predict the likelihoods using a machine-learning model. In such embodiments, the online system may train the machine-learning model using at least some of the information associated with the presentation of content items to various online system users. For example, the online system may identify information stored in the online system describing each presentation of a content item to a user of the online system, in which the online system later received information indicating the user's familiarity with the content item. In this example, the online system may train a model based on the identified information (e.g., information describing each user's interaction with the content item, one or more topics associated with the content item, attributes for the user, information indicating the user's familiarity with the content item, and a difference between the time of the interaction and the time that the online system received the information indicating the user's familiarity with the content item). Continuing with this example, the online system may identify online system users who were presented with the content item, but from whom the online system did not subsequently receive information indicating their familiarity with the content item and use the model to predict likelihoods that the users are familiar with information associated with this content item (e.g., by providing attributes for the users and the times at which the content item was presented to the users as inputs to the model). In the above example, the online system also may use the model to predict likelihoods that the users are familiar with information associated with similar content items (e.g., content items associated with the same topics).

The online system may determine a weight of a connection to be established between a user of the online system and a topic associated with one or more content items maintained in the online system. The weight of a connection to be established between a user and a topic may correspond to a predicted level of knowledge that the user has about the topic. For example, the weight of a connection to be established between a user of the online system and a topic of cooking that is associated with various content items maintained in the online system may be proportional to a predicted level of knowledge that the user has about cooking. In some embodiments, the weight may be represented as a numerical value (e.g., a value from 0 to 1), in which a higher value corresponds to a higher predicted level of knowledge and a lower value corresponds to a lower predicted level of knowledge.

The online system may determine the weight of a connection to be established between a user and a topic based at least in part on a predicted likelihood that the user is familiar with information associated with one or more content items associated with the topic. For example, once the online system has predicted a likelihood that a user is familiar with information associated with a content item associated with a topic, the online system may determine a weight of a connection to be established between the user and the topic that is proportional to the predicted likelihood. As an additional example, once the online system has predicted a likelihood that a user is familiar with information associated with each of multiple content items associated with a topic, the online system may determine a weight of a connection to be established between the user and the topic that is proportional to an average of the predicted likelihoods.

The online system also may determine a weight of a connection between a user and a topic based at least in part on a predicted accuracy of an assignment of the topic to one or more content items. For example, the online system may obtain a value by discounting a predicted likelihood that a user of the online system is familiar with information associated with a content item associated with a topic by an amount that is inversely proportional to a predicted accuracy of the assignment of the topic to the content item. In this example, the online system may determine a weight of a connection between the user and the topic that is equal to or proportional to the obtained value. In the above example, if the topic is associated with multiple content items, the online system also may obtain the value by discounting the predicted likelihood by an amount that is inversely proportional to an average of the predicted accuracies of the assignment of the topic to the content items.

The online system may predict the accuracy of an assignment of a topic to a content item based on the manner in which the topic was assigned to the content item. For example, the online system may predict that assignments of topics to content items by a content-providing user from whom the content items were received have greater accuracies than assignments of topics to content items by a machine-learning model. As an additional example, in embodiments in which a topic is assigned to a content item by a machine-learning model, the online system also may predict an accuracy of the assignment (e.g., based on the size of a training data set used to train the model, based on an amount of information associated with the content item, and/or based on the type of information associated with the content item used as an input to the model, etc.).

In some embodiments, the online system also may determine a weight of a connection to be established between a user and a topic based on relationships between the topic and one or more additional topics to which the user is connected. For example, if a user is connected to topics associated with video games (e.g., video game consoles, types of video games, etc.), the online system may determine a weight of a connection between the user and an additional topic based on a relationship between the topic and the topic of video games. In this example, if the additional topic is related to video games (e.g., a name of a video game manufacturer), the online system may discount the predicted likelihood that the user is familiar with information associated with content items associated with the additional topic by a smaller value than if the additional topic were unrelated to video games. Continuing with this example, the online system may determine the weight of a connection between the user and the additional topic to be proportional to the discounted likelihood.

In some embodiments, the online system may determine relationships between a topic and additional topics to which a user is connected by accessing a hierarchical taxonomy. In such embodiments, the online system may identify a node in the hierarchical taxonomy corresponding to the topic and determine a number of nodes that must be traversed from this node to reach each node corresponding to each additional topic to which the user is connected. The online system may then determine that a closeness of a relationship between the topic and each additional topic to which the user is connected is inversely proportional to the number of nodes that must be traversed.

Based on a weight of a connection to be established between a user of the online system and a topic associated with one or more content items maintained in the online system, the online system may generate the connection having the determined weight, in which the weight corresponds to a predicted level of knowledge that the user has about the topic. In some embodiments, the online system may generate a connection between a user and a topic by identifying a node in a hierarchical taxonomy corresponding to the topic and generating an edge between a node corresponding to the user and the node corresponding to the topic. For example, the online system may identify a node within a hierarchical taxonomy corresponding to a topic for which the online system has determined a weight of a connection to be established between a user of the online system and the topic. In this example, the online system may generate a node corresponding to the user, as well as an edge between the node corresponding to the user and the node corresponding to the topic.

Once the online system has generated connections between users of the online system and various topics, the online system may access the connections to retrieve information indicating the users' predicted level of knowledge about the topics. For example, the online system may identify nodes corresponding to a user and a topic within a hierarchical taxonomy and access information stored in association with an edge between the nodes corresponding to a connection between the user and the topic. In this example, based on the weight of the connection, the online system may retrieve information indicating the user's predicted level of knowledge about the topic.

The online system may retrieve information indicating a user's predicted level of knowledge about a topic for various purposes. In some embodiments, the online system may do so to identify content items eligible for presentation to the user. For example, upon identifying an opportunity to present content to a viewing user of the online system, if targeting criteria associated with a content item related to the topic of bicycles identify online system users who have an interest in bicycles as eligible to be presented with the content item, the online system may determine whether the viewing user is eligible to be presented with the content item based on a connection between the user and the topic of bicycles. In this example, the online system may identify the content item as a candidate content item that is eligible for presentation to the user if a weight of the connection indicates that the viewing user has at least a threshold predicted level of knowledge about bicycles and therefore likely has an interest in bicycles. As an additional example, the online system may compare a viewing user's predicted level of knowledge about a topic to a threshold level of knowledge and identify a content item associated with the topic that is eligible for presentation to the viewing user based on the comparison. In this example, the online system may identify a direct response advertisement as being eligible for presentation to the viewing user if the viewing user's predicted level of knowledge about the topic is at least the threshold level. Alternatively, in this example, the online system may identify a different type of advertisement as being eligible for presentation to the viewing user if the viewing user's predicted level of knowledge about the topic is less than the threshold level.

In some embodiments, the online system also may retrieve information indicating a user's predicted level of knowledge about a topic to select one or more content items for presentation to the user. For example, the online system may rank candidate content items eligible to be presented to a viewing user based on the viewing user's predicted level of knowledge about topics associated with the candidate content items. In this example, the online system may assign a higher rank to candidate content items associated with topics for which the viewing user has a higher predicted level of knowledge than to candidate content items associated with topics for which the viewing user has a lower predicted level of knowledge. Continuing with this example, the online system may select one or more of the highest ranked candidate content items for presentation to the viewing user. In the above example, if multiple content items are selected for presentation to the viewing user and the selected content items are to be included in a feed of content items (e.g., a newsfeed), the content items may be arranged based on the ranking, such that higher ranked content items are presented in more prominent positions in the feed than lower ranked content items.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
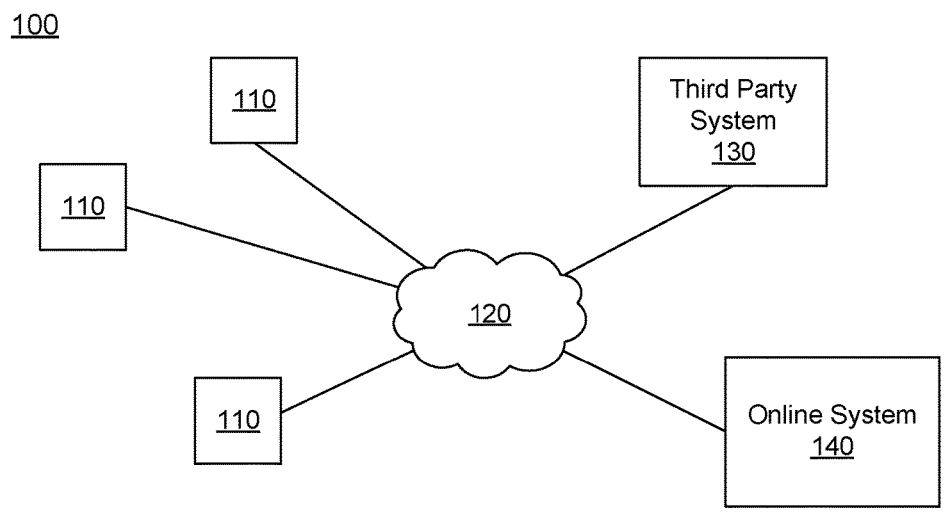
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
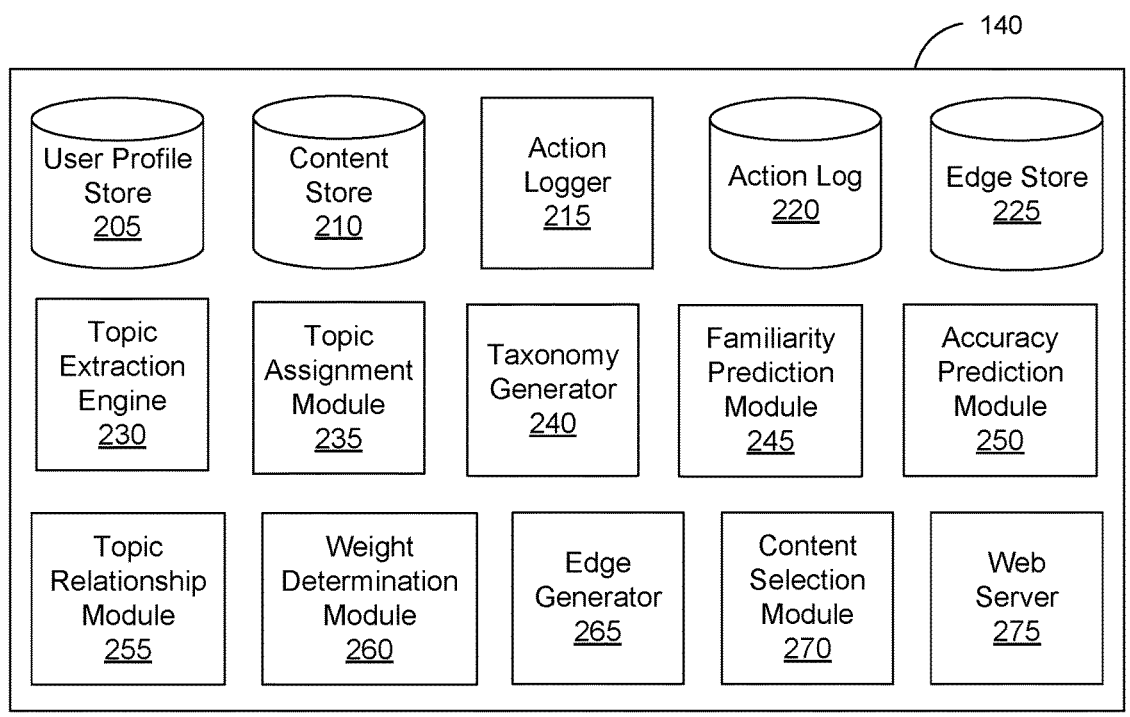
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a topic extraction engine 230, a topic assignment module 235, a taxonomy generator 240, a familiarity prediction module 245, an accuracy prediction module 250, a topic relationship module 255, a weight determination module 260, an edge generator 265, a content selection module 270, and a web server 275. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

The user profile store 205 also may store user-identifying information associated with users of the online system 140. In some embodiments, user-identifying information associated with a user of the online system 140 may include personally identifiable information. Examples of personally identifiable information that may be associated with a user of the online system 140 may include a full name, a home address, a phone number, an email address, a user identifier (e.g., a username, a user identification number, or a cookie identifier), a client device identifier (e.g., an IP address), a browser identifier (e.g., a user agent), etc. User-identifying information also may include information that potentially may be combined with other personal information to identify a user of the online system 140 (e.g., an age, a gender, a geographic region, etc.).

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 may store (e.g., as shown in step 302 of FIG. 3) objects representing content items received from content-providing users of the online system 140. Each content item received from a content-providing user may be associated with various types of information that may be used to uniquely identify the content item. For example, a content item may be identified based on a name or other information identifying a content-providing user of the online system 140 from whom the content item was received and on an identification number or other unique identifier assigned to the content item by the content-providing user. As an additional example, a content item may be identified based on a unique identification number assigned to each content item maintained in the online system 140 by the online system 140. In the above examples, the information that may be used to uniquely identify each content item may be stored in association with an object representing the content item in the content store 210.

Each content item stored in the content store 210 also may be associated with one or more topics. Examples of topics that may be associated with a content item include a name (e.g., a brand name or name of an entity) or other identifier associated with a content-providing user from whom the content item was received, a type of product, service, opinion, or cause associated with the content item, a subject of a story being told in the content item, a keyword included in a title of the content item, etc. For example, suppose that a content-providing user of the online system 140 is an entity that manufactures a certain brand of boots and that the online system 140 receives a content item from the content-providing user that is an advertisement for boots of that brand. In this example, the advertisement may be associated with topics including shoes, boots, and the name of the brand. In some embodiments, topics associated with one or more content items may have a hierarchical relationship, such that the topics may be arranged in order of increasing specificity. In the above example, since boots are a type of shoe, the topic of boots may be a more specific topic (i.e., a subtopic) within the topic of shoes. Furthermore, in the above example, since boots of the brand are a type of boot, the name of the brand may be a subtopic within the topic of boots.

Content items may be associated with topics that are assigned to them. In some embodiments, topics may be assigned to content items by content-providing users of the online system 140 from whom the content items were received. For example, a content item may be associated with metadata indicating topics associated with the content item that were assigned to the content item by a content-providing user of the online system 140 from whom the content item was received. In various embodiments, topics also may be assigned to content items by the topic assignment module 235, described below.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in the third-party system 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

Upon presenting content items to users of the online system 140, the online system 140 may store (e.g., as shown in step 320 of FIG. 3) information associated with each presentation of a content item to an online system user in the action log 220. Information associated with the presentation of a content item to an online system user may describe a type of interaction with the content item by the user (e.g., clicking on the content item, sharing the content item with additional online system users, expressing a preference for the content item, commenting on the content item, etc.), attributes for the user (e.g., demographic information, hobbies/interests, or any other types of information stored in association with a user profile of the user), one or more topics associated with the content item, a date/time of the presentation, etc. For example, upon presenting a content item to a user of the online system 140, the online system 140 may receive information indicating that the user clicked on the content item, user-identifying information for the user (e.g., a username or an IP address associated with the user), information identifying the content item (e.g., an identification number or other unique identifier associated with the content item), and a date and a time that the user clicked on the content item. In this example, the online system 140 may retrieve one or more topics associated with the content item based on the information identifying the content item and one or more attributes for the user based on the user-identifying information. Continuing with this example, the online system 140 may store the information indicating that the user clicked on the content item, the user-identifying information for the user, the information identifying the content item, and the date and the time that the user clicked on the content item in association with the topics associated with the content item and the attributes for the user (e.g., as a record in a table) in the action log 220.

Information associated with the presentation of a content item to an online system user that is stored in the action log 220 also may include information describing the user's familiarity with the content item. Once the online system 140 has presented content items to users of the online system 140, the online system 140 subsequently may receive information indicating the users' familiarity with the content items. In some embodiments, the online system 140 may receive this information in response to a request for information communicated to the users by the online system 140 (e.g., in the form of a questionnaire or a survey). For example, if the online system 140 presents a particular content item to a user of the online system 140, the online system 140 may send a questionnaire to the user one week later asking the user whether they recall being presented with the content item one week ago and whether the user recalls various details associated with the content item (e.g., its content, a call to action associated with the content item, etc.). Upon receiving information indicating a user's familiarity with a content item previously presented to the user, the online system 140 may store this information in the action log 220, such that it is included among information associated with the presentation of the content item previously received at the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The online system 140 includes a topic extraction engine 230, which identifies (e.g., as shown in step 304 of FIG. 3) one or more topics associated with objects (e.g., content items) in the content store 210. To identify topics associated with content items, the topic extraction engine 230 identifies anchor terms included in a content item and determines a meaning of the anchor terms as further described in U.S. patent application Ser. No. 13/167,701 (U.S. Pat. No. 9,779,385, issued on Oct. 3, 2017), filed on Jun. 24, 2011, which is hereby incorporated by reference in its entirety. For example, the topic extraction engine 230 determines one or more topics associated with a content item maintained in the content store 210. The one or more topics associated with a content item are stored and associated with an object identifier corresponding to the content item. In various embodiments, associations between object identifiers and topics are stored in the topic extraction engine 230 or in the content store 210 to simplify retrieval of one or more topics associated with an object identifier or retrieval of object identifiers associated with a specified topic. Structured information associated with a content item also may be used to extract a topic associated with the content item.

In some embodiments, the topic extraction engine 230 may identify topics associated with content items by reviewing metadata associated with the content items for various anchor terms. For example, by performing a search of metadata associated with images included in a content item for various anchor terms, the topic extraction engine 230 may identify one or more topics associated with the content item. The functionality of the topic extraction engine 230 is further described below in conjunction with FIG. 3.

The topic assignment module 235 may assign (e.g., as shown in step 308 of FIG. 3) one or more topics to one or more content items maintained in the online system 140. In embodiments in which a content item received from a content-providing user is already associated with one or more topics that were assigned to the content item by the content-providing user, the topic assignment module 235 may assign one or more additional topics to the content item. In some embodiments, once the topic extraction engine 230 has identified one or more topics associated with a content item, the topic assignment module 235 may assign the identified topics to the content item. For example, if the topic extraction engine 230 identifies "journalism" as an anchor term included in the text of a content item and/or in metadata associated with the content item, the topic assignment module 235 may assign the topic of journalism to the content item.

In some embodiments, the topic assignment module 235 also may assign one or more topics to a content item using a machine-learning model. In such embodiments, the topic assignment module 235 may train (e.g., as shown in step 306 of FIG. 3) the machine-learning model based on information associated with content items to which topics have been assigned. Examples of information that may be used to train a machine-learning model to assign topics to content items include information associated with content-providing users of the online system 140 from whom the content items were received, targeting criteria associated with the content items identifying attributes for online system users eligible to be presented with the content items, attributes for online system users presented with the content items who interacted with the content items, attributes for online system users presented with the content items who did not interact with the content items, metadata associated with the content items, etc. For example, the topic assignment module 235 may train a model based on information associated with content items to which various topics have been assigned, such as information identifying industries or organizations associated with content-providing users of the online system 140 from whom the content items were received and information included in targeting criteria associated with the content items describing hobbies, interests, and demographic information that may be associated with online system users eligible to be presented with the content items.

In embodiments in which the topic assignment module 235 assigns one or more topics to a content item, the topic assignment module 235 may store (e.g., as shown in step 310 of FIG. 3) information describing the assignments in association with the content item (e.g., in the content store 210). The functionality of the topic assignment module 235 is further described below in conjunction with FIG. 3.

The taxonomy generator 240 generates (e.g., as shown in step 312 of FIG. 3) one or more hierarchical taxonomies based on various topics associated with content items maintained in the online system 140. A hierarchical taxonomy may include multiple levels arranged in order of increasing specificity and each level of the hierarchical taxonomy may include one or more topics with which a content item may be associated. Each topic within a hierarchical taxonomy may include a set of more specific subtopics within a more specific level of the hierarchical taxonomy. Once the taxonomy generator 240 has generated a hierarchical taxonomy, the taxonomy generator 240 subsequently may add more topics/nodes to the hierarchical taxonomy. For example, upon receiving one or more content items associated with topics that are related to, but not included in a hierarchical taxonomy, the taxonomy generator 240 may add a node corresponding to each topic to one or more levels of the hierarchical taxonomy.

In some embodiments, a hierarchical taxonomy may be represented as a collection of nodes, in which each topic included in the hierarchical taxonomy corresponds to a node. For example, if the taxonomy generator 240 generates a hierarchical taxonomy based on topics associated with content items maintained in the online system 140 related to flooring materials, a highest level of the hierarchical taxonomy may include a node corresponding to a broadest topic that may be associated with the content items (e.g., flooring materials). In this example, the broadest topic may include a set of subtopics corresponding to nodes within a lower level of the hierarchical taxonomy, in which each subtopic may be associated with a more specific type of flooring material (e.g., wood flooring, marble flooring, laminate flooring, carpet, etc.). Continuing with this example, each subtopic also may include a set of even more specific subtopics corresponding to nodes within an even lower level of the hierarchical taxonomy, in which each subtopic may be associated with even more specific types of flooring materials (e.g., types of wood flooring, types of marble flooring, types of laminate flooring, types of carpet, etc.). The functionality of the taxonomy generator 240 is further described below in conjunction with FIGS. 3 and 4A.

The familiarity prediction module 245 predicts (e.g., as shown in step 324 of FIG. 3) likelihoods that online system users are familiar with information associated with various content items maintained in the online system 140. The familiarity prediction module 245 may use information associated with the presentation of content items to various online system users to predict likelihoods that additional online system users are familiar with information associated with the same or similar content items based on attributes for these additional users. For example, to predict a likelihood that an online system user is familiar with information associated with a content item, the familiarity prediction module 245 may access the action log 220 to retrieve information associated with the presentation of the same content item to various online system users who share at least a threshold number of attributes with the user. In this example, based on the users' responses to questionnaires about the content item stored in the action log 220, the familiarity prediction module 245 may predict the user's familiarity with the content item.

In some embodiments, the familiarity prediction module 245 may predict likelihoods that online system users are familiar with information associated with various content items maintained in the online system 140 using a machine-learning model. In such embodiments, the familiarity prediction module 245 may train (e.g., as shown in step 322 of FIG. 3) the machine-learning model using information associated with presentations of content items to various online system users. For example, the familiarity prediction module 245 may identify information stored in the action log 220 describing each presentation of a content item to a user of the online system 140, in which the online system 140 later received information indicating the user's familiarity with the content item. In this example, the familiarity prediction module 245 may train a model based on the identified information (e.g., information describing each user's interaction with the content item, one or more topics associated with the content item, attributes for the user, information indicating the user's familiarity with the content item, and a difference between the time of the interaction and the time that the online system 140 received the information indicating the user's familiarity with the content item). Continuing with this example, the familiarity prediction module 245 may identify online system users who were presented with the content item, but from whom the online system 140 did not subsequently receive information indicating their familiarity with the content item. In this example, the familiarity prediction module 245 may then use the model to predict likelihoods that the identified users are familiar with information associated with this content item (e.g., by providing attributes for the identified users and the times at which the content item was presented to the identified users as inputs to the model). In the above example, the familiarity prediction module 245 also may use the model to predict likelihoods that the identified users are familiar with information associated with similar content items (e.g., content items associated with the same topics). The functionality of the familiarity prediction module 245 is further described below in conjunction with FIG. 3.

The accuracy prediction module 250 predicts (e.g., as shown in step 326 of FIG. 3) accuracies of assignments of topics to various content items maintained in the online system 140. The accuracy prediction module 250 may predict the accuracy of an assignment of a topic to a content item based on the manner in which the topic was assigned to the content item. For example, the accuracy prediction module 250 may predict that assignments of topics to content items by a content-providing user of the online system 140 from whom the content items were received have greater accuracies than topics assigned to content items by a machine-learning model. As an additional example, in embodiments in which a topic is assigned to a content item by a machine-learning model, the accuracy prediction module 250 also may predict an accuracy of the assignment (e.g., based on the size of a training data set used to train the model, based on an amount of information associated with the content item, and/or based on the type of information associated with the content item used as an input to the model, etc.). The functionality of the accuracy prediction module 250 is further described below in conjunction with FIG. 3.

The topic relationship module 255 may determine (e.g., as shown in step 328 of FIG. 3) relationships between a topic and one or more additional topics to which a user of the online system 140 is connected. In some embodiments, the topic relationship module 255 may determine relationships between a topic and additional topics to which the user is connected by accessing a hierarchical taxonomy. In such embodiments, the topic relationship module 255 may identify a node in the hierarchical taxonomy corresponding to the topic and determine a number of nodes that must be traversed from this node to reach each node corresponding to each additional topic to which the user is connected. The topic relationship module 255 may then determine that a closeness of a relationship between the topic and each additional topic to which the user is connected is inversely proportional to the number of nodes that must be traversed.

To illustrate an example of how the topic relationship module 255 may determine relationships between a topic and one or more additional topics to which a user of the online system 140 is connected, suppose that a user of the online system 140 is connected to the topic of dogs. In this example, the topic relationship module 255 may determine that a relationship between the topic of dogs and the topic of cats is inversely proportional to the number of nodes in a hierarchical taxonomy that must be traversed from a node corresponding to the topic of dogs to a node corresponding to the topic of cats. Continuing with this example, if nodes corresponding to the topics of dogs and cats are both directly connected to a node corresponding to the topic of pets, the topic relationship module 255 may determine that there is a close relationship between the topic of dogs and cats. In the above example, if the additional topic is penguins and nodes in the hierarchical taxonomy corresponding to the topics of dogs and penguins are both indirectly connected to a node corresponding to the topic of animals, the topic relationship module 255 may determine that there is a relationship between the topic of dogs and the topic of penguins, but that the relationship is not as close as the relationship between the topics of dogs and cats. The functionality of the topic relationship module 255 is further described below in conjunction with FIG. 3.

The weight determination module 260 determines (e.g., as shown in step 330 of FIG. 3) a weight of a connection to be established between a user of the online system 140 and a topic associated with one or more content items maintained in the online system 140. The weight of a connection to be established between a user and a topic may correspond to a predicted level of knowledge that the user has about the topic. For example, the weight of a connection to be established between a user of the online system 140 and a topic of knitting associated with various content items maintained in the online system 140 may be proportional to a predicted level of knowledge that the user has about knitting. In some embodiments, the weight of a connection may be represented as a numerical value, in which a higher value corresponds to a higher predicted level of knowledge and a lower value corresponds to a lower predicted level of knowledge. For example, a weight of a connection to be established between a user and a topic may range from 0 to 1, in which a value of 0 indicates that the user is predicted to have no knowledge about the topic and a value of 1 indicates that the user is an expert in the topic.

The weight determination module 260 may determine the weight of a connection to be established between a user and a topic based at least in part on a predicted likelihood that the user is familiar with information associated with one or more content items associated with the topic. For example, once the familiarity prediction module 245 has predicted a likelihood that a user is familiar with information associated with a content item associated with a topic, the weight determination module 260 may determine a weight of a connection to be established between the user and the topic that is proportional to the predicted likelihood. As an additional example, once the familiarity prediction module 245 has predicted a likelihood that a user is familiar with information associated with each of multiple content items associated with a topic, the weight determination module 260 may determine a weight of a connection to be established between the user and the topic that is proportional to an average of the predicted likelihoods.

The weight determination module 260 also may determine a weight of a connection to be established between a user and a topic based at least in part on a predicted accuracy of an assignment of the topic to one or more content items. For example, the weight determination module 260 may obtain a value by discounting a predicted likelihood that a user of the online system 140 is familiar with information associated with a content item associated with a topic by an amount that is inversely proportional to a predicted accuracy of the assignment of the topic to the content item. In this example, the weight determination module 260 may determine a weight of a connection to be established between the user and the topic that is equal to or proportional to the obtained value. In the above example, if the topic is associated with multiple content items, the weight determination module 260 also may obtain the value by discounting the predicted likelihood by an amount that is inversely proportional to an average of the predicted accuracies of the assignment of the topic to the content items.

In some embodiments, the weight determination module 260 also may determine a weight of a connection to be established between a user and a topic based on relationships between the topic and one or more additional topics to which the user is connected. For example, if a user is connected to topics associated with sports (e.g., sports teams, types of sports, etc.), the weight determination module 260 may determine a weight of a connection to be established between the user and an additional topic based on a relationship between the topic and the topic of sports. In this example, if the additional topic is related to sports (e.g., a type of sports equipment), the weight determination module 260 may discount the predicted likelihood that the user is familiar with information associated with content items associated with the additional topic by a smaller value than if the additional topic were unrelated to the topic of sports or other topics to which the user is connected. Continuing with this example, the weight determination module 260 may determine the weight of a connection to be established between the user and the additional topic to be proportional to the discounted likelihood. In embodiments in which the weight determination module 260 determines a weight of a connection to be established between a user and a topic based on relationships between the topic and one or more additional topics to which the user is connected, the relationship between the topic and each additional topic to which the user is connected may be determined by the topic relationship module 255, as described above. The functionality of the weight determination module 260 is further described below in conjunction with FIG. 3.

The edge generator 265 generates (e.g., as shown in step 332 of FIG. 3) connections between users of the online system 140 and various topics associated with content items maintained in the online system 140. Once the weight determination module 260 has determined a weight of a connection to be established between a user of the online system 140 and a topic associated with one or more content items maintained in the online system 140, the edge generator 265 may generate a connection between the user and the topic, in which the connection has a weight corresponding to a predicted level of knowledge that the user has about the topic. For example, once the weight determination module 260 has determined a weight of a connection to be established between a user and a topic of photography, the edge generator 265 may generate a connection between the user and the topic. In this example, the weight of the connection is proportional to the user's predicted level of knowledge about the topic of photography, such that the connection has a greater weight if the user is predicted to be an expert photographer than if the user is predicted to be a novice photographer.

In some embodiments, the edge generator 265 may generate a connection between a user and a topic by identifying a node in a hierarchical taxonomy corresponding to the topic and generating an edge between a node corresponding to the user and the node corresponding to the topic. For example, the edge generator 265 may access a hierarchical taxonomy generated by the taxonomy generator 240 and identify a node within the hierarchical taxonomy corresponding to a topic for which the weight determination module 260 has determined a weight of a connection to be established between a user of the online system 140 and the topic. In this example, the edge generator 265 may generate a node corresponding to the user, as well as an edge between the node corresponding to the user and the node corresponding to the topic, in which the edge corresponds to a connection between the user and the topic and has the weight determined by the weight determination module 260. The functionality of the edge generator 265 is further described below in conjunction with FIGS. 3 and 4B.

The content selection module 270 may identify (e.g., as shown in step 338 of FIG. 3) candidate content items eligible for presentation to viewing users of the online system 140. The content selection module 270 may identify candidate content items eligible for presentation to a viewing user based at least in part on information indicating the viewing user's predicted level of knowledge about a topic. In some embodiments, the content selection module 270 also may take into account additional factors when identifying candidate content items eligible for presentation to viewing users of the online system 140 (e.g., targeting criteria). For example, upon identifying an opportunity to present content to a viewing user of the online system 140, if targeting criteria associated with a content item related to the topic of bicycles identify online system users who have an interest in bicycles as eligible to be presented with the content item, the content selection module 270 may access the edge store 225 and retrieve information describing an edge/connection between the viewing user and the topic of bicycles. In this example, the content selection module 270 may identify the content item as a candidate content item that is eligible for presentation to the viewing user if a weight of the connection indicates that the viewing user has at least a threshold predicted level of knowledge about bicycles and therefore likely has an interest in bicycles. As an additional example, the content selection module 270 may compare a viewing user's predicted level of knowledge about a topic to a threshold level of knowledge and identify a candidate content item associated with the topic that is eligible for presentation to the viewing user based on the comparison. In this example, the content selection module 270 may identify a direct response advertisement as being eligible for presentation to the viewing user if the viewing user's predicted level of knowledge about the topic is at least the threshold level. Alternatively, in this example, the content selection module 270 may identify a different type of advertisement as being eligible for presentation to the viewing user if the viewing user's predicted level of knowledge about the topic is less than the threshold level.

The content selection module 270 also may select (e.g., as shown in step 340 of FIG. 3) one or more candidate content items for presentation to viewing users of the online system 140. In some embodiments, the content selection module 270 may rank candidate content items based at least in part on a value associated with each candidate content item and select one or more candidate content items having the highest values for presentation to a viewing user of the online system 140. In various embodiments, a value associated with a candidate content item may correspond to information indicating a viewing user's predicted level of knowledge about a topic. For example, the content selection module 270 may rank candidate content items eligible to be presented to a viewing user based on the viewing user's predicted level of knowledge about topics associated with the candidate content items. In this example, the content selection module 270 may assign a higher rank to candidate content items associated with topics for which the viewing user has a higher predicted level of knowledge than to candidate content items associated with topics for which the viewing user has a lower predicted level of knowledge. Continuing with this example, the content selection module 270 may select one or more of the highest ranked candidate content items for presentation to the viewing user.

In some embodiments, a value associated with a candidate content item also may correspond to a score computed by the content selection module 270 that indicates a predicted affinity of a viewing user of the online system 140 for the candidate content item, a bid amount, or any other suitable value that may be associated with a content item. For example, the content selection module 270 may rank a set of candidate content items based at least in part on a bid amount associated with each candidate content item. In this example, the content selection module 270 may then select one or more of the candidate content items for presentation to a viewing user of the online system 140 based at least in part on the ranking. In the above example, the content selection module 270 also may compute an affinity score for each candidate content item that indicates a predicted affinity of the viewing user for the candidate content item. Continuing with this example, the content selection module 270 may then rank the candidate content items based at least in part on the bid amount and/or on the affinity score associated with each candidate content item and select one or more of the candidate content items for presentation to the viewing user based at least in part on the ranking.

In embodiments in which the content selection module 270 selects multiple content items for presentation to a viewing user of the online system 140 based at least in part on a ranking of the content items, the content items may be arranged in a user interface that is presented to the viewing user based at least in part on the ranking. For example, suppose that multiple content items are selected for presentation to a viewing user of the online system 140 and the selected content items are to be included in a feed of content items (e.g., a newsfeed). In this example, the content items may be arranged based at least in part on the ranking, such that higher ranked content items are presented in more prominent positions in the feed than lower ranked content items. The functionality of the content selection module 270 is further described below in conjunction with FIG. 3.

The web server 275 links the online system 140 via the network 120 to the one or more client devices 110, as well as to the third-party system 130 and/or one or more third-party systems 130. The web server 275 serves web pages, as well as other content, such as JAVA®, FLASH®, XML and so forth. The web server 275 may receive and route messages between the online system 140 and the client device 110, for example, instant messages, queued messages (e.g., email), text messages, short message service (SMS) messages, or messages sent using any other suitable messaging technique. A user may send a request to the web server 275 to upload information (e.g., images or videos) that are stored in the content store 210. Additionally, the web server 275 may provide application programming interface (API) functionality to send data directly to native client device operating systems, such as IOS®, ANDROID™, WEBOS® or BlackberryOS.

Figure 3:
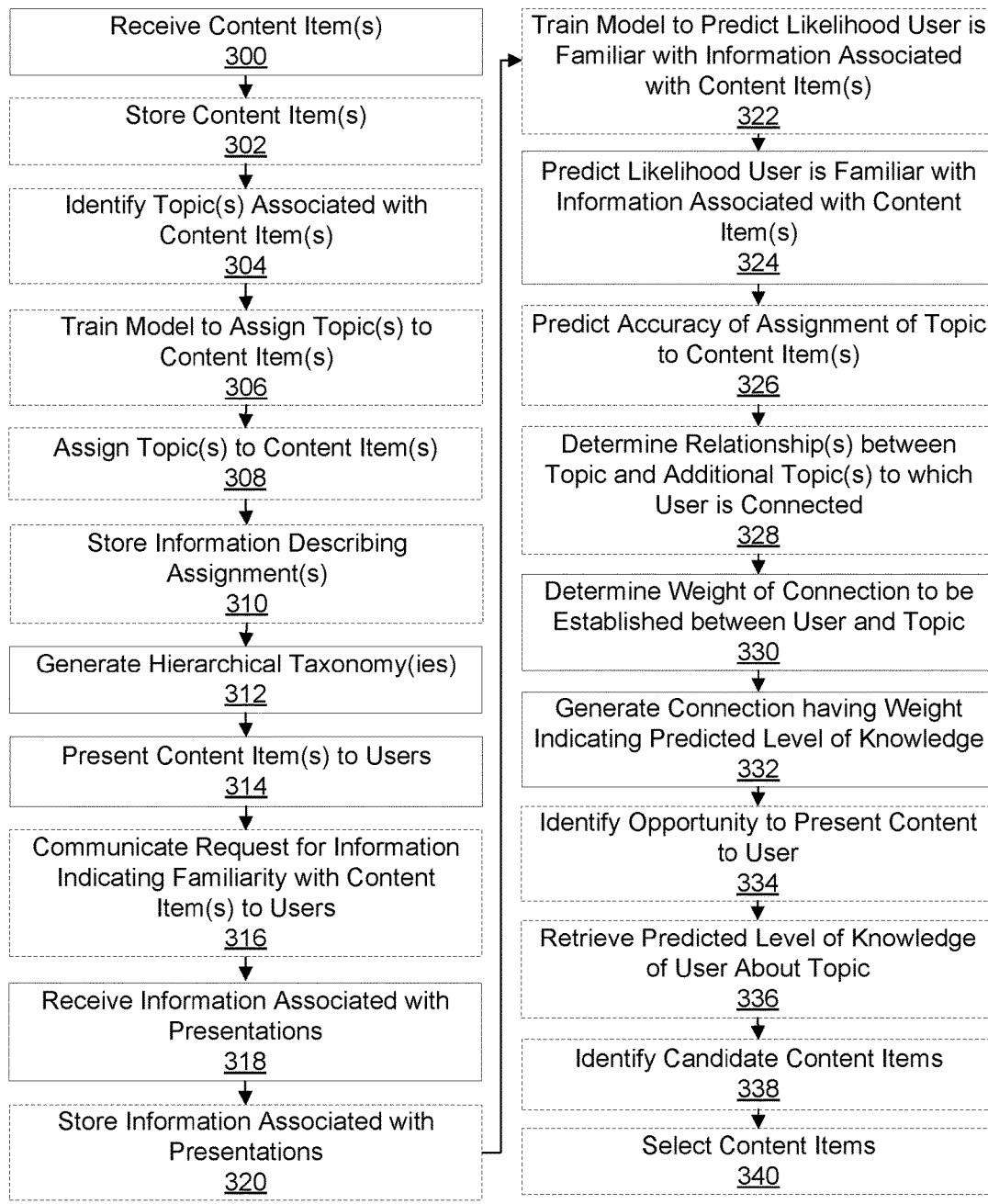
FIG. 3 is a flow chart of a method for predicting a level of knowledge that a user of an online system has about a topic associated with a set of content items maintained in the online system, in accordance with an embodiment.

Predicting a Level of Knowledge that a User of an Online System has about a Topic Associated with a Set of Content Items Maintained in the Online System FIG. 3 is a flow chart of a method for predicting a level of knowledge that a user of an online system has about a topic associated with a set of content items maintained in the online system. In other embodiments, the method may include different and/or additional steps than those shown in FIG. 3. Additionally, steps of the method may be performed in a different order than the order described in conjunction with FIG. 3.

The online system 140 receives 300 a set of content items from one or more content-providing users of the online system 140. Each content item received 300 from a content-providing user of the online system 140 may be associated with one or more topics. Examples of topics that may be associated with a content item include a name or other identifier associated with a content-providing user from whom the content item was received 300, a type of product, service, opinion, or cause associated with the content item, a subject of a story being told in the content item, a keyword included in a title of the content item, etc. For example, suppose that a content-providing user of the online system 140 is an entity that manufactures a certain brand of electric car and that the online system 140 receives 300 a content item from the content-providing user that is an advertisement for electric cars of that brand. In this example, the advertisement may be associated with topics including cars, electric cars, and the name of the brand. In some embodiments, topics associated with one or more content items may have a hierarchical relationship, such that the topics may be arranged in order of increasing specificity. In the above example, since an electric car is a type of car, the topic of electric cars may be a more specific topic (i.e., a subtopic) within the topic of cars. Furthermore, in the above example, since an electric car of the brand is a type of electric car, the name of the brand may be a subtopic within the topic of electric cars.

Content items may be associated with topics that are assigned to them. In some embodiments, topics may be assigned to content items by content-providing users of the online system 140 from whom the content items were received 300. For example, a content item may be associated with metadata indicating topics associated with the content item that were assigned to the content item by a content-providing user of the online system 140 from whom the content item was received 300. As an additional example, if a content item is an advertisement for a Memorial Day sale at a department store and the advertisement is received 300 from a content-providing user of the online system 140 who is an advertiser, the advertiser may assign topics associated with the advertisement that include the topics of Memorial Day, sales, the name of the department store, etc.

Each content item received 300 from a content-providing user also may be associated with various types of information that may be used to uniquely identify the content item. For example, a content item may be associated with information identifying a content-providing user of the online system 140 from whom the content item was received 300 and a title or other unique identifier assigned to the content item by the content-providing user. As an additional example, a content item may be associated with a unique identification number assigned by the online system 140 to each content item received 300 from a content-providing user of the online system 140.

The online system 140 may store 302 each content item received 300 from a content-providing user of the online system 140 (e.g., in the content store 210). The online system 140 may store 302 each content item in association with one or more topics associated with the content item. For example, the online system 140 may store 302 an object representing a content item in the content store 210 in association with one or more topics assigned to the content item by a content-providing user of the online system 140 from whom the content item was received 300. The online system 140 also may store 302 each content item in association with information that may be used to uniquely identify the content item. In the above example, the online system 140 may store 302 the object in the content store 210 in association with a unique identifier assigned to the content item by the content-providing user or by the online system 140.

In various embodiments, the online system 140 may identify 304 (e.g., using the topic extraction engine 230) one or more topics associated with each content item received 300 from a content-providing user of the online system 140. In some embodiments, the online system 140 may identify (in step 304) topics associated with content items by reviewing the content of the content items and/or by reviewing metadata associated with the content items for various anchor terms. For example, by reviewing the text and images included in a content item (e.g., manually or by performing search of the text and metadata associated with the images for various anchor terms), the online system 140 may identify 304 one or more topics associated with the content item.

In some embodiments, the online system 140 may train 306 (e.g., using the topic assignment module 235) a model to assign one or more topics to each content item received 300 from a content-providing user of the online system 140. In such embodiments, the online system 140 may train 306 the machine-learning model based on information associated with content items to which topics have been assigned. Examples of information that may be used to train 306 a machine-learning model to assign topics to content items include information associated with content-providing users of the online system 140 from whom the content items were received 300, targeting criteria associated with the content items identifying attributes for online system users eligible to be presented with the content items, attributes for online system users presented with the content items who interacted with the content items, attributes for online system users presented with the content items who did not interact with the content items, metadata associated with the content items, etc. For example, the online system 140 may train 306 a model based on information associated with content items to which various topics have been assigned, such as information identifying industries or organizations associated with content-providing users of the online system 140 from whom the content items were received 300 and information included in targeting criteria associated with the content items describing hobbies, interests, and demographic information that may be associated with online system users eligible to be presented with the content items.

The online system 140 may assign 308 (e.g., using the topic assignment module 235) one or more topics to each content item received 300 from a content-providing user of the online system 140. In embodiments in which a content item received 300 from a content-providing user is already associated with one or more topics that were assigned to the content item by the content-providing user, the online system 140 may assign 308 one or more additional topics to the content item. In some embodiments, once the online system 140 has identified 304 one or more topics associated with a content item, the online system 140 may assign 308 the identified topics to the content item. For example, if the online system 140 identifies 304 "journalism" as a keyword included in the text of the content item and metadata associated with the content item, the online system 140 may assign 308 the topic of journalism to the content item. In embodiments in which the online system 140 trains 306 a model to assign 308 one or more topics to each content item received 300 from a content-providing user of the online system 140, the online system 140 also may assign 308 one or more topics to a content item using the model. In the above example, if the online system 140 has trained 306 a model to assign (in step 308) topics to content items, the online system 140 also may use the model to assign 308 one or more additional topics to the content item.

In embodiments in which the online system 140 assigns 308 one or more topics to a content item received 300 from a content-providing user of the online system 140, the online system 140 may store 310 (e.g., using the topic assignment module 335) information describing the assignments. In such embodiments, the online system 140 may store 310 information describing each topic assigned to a content item in association with the content item (e.g., in the content store 210). For example, the online system 140 may store 310 information describing each topic assigned 308 to a content item received 300 from a content-providing user of the online system 140 in association with an object representing the content item in the content store 210.

The online system 140 generates 312 (e.g., using the taxonomy generator 240) one or more hierarchical taxonomies based on various topics associated with content items maintained in the online system 140. A hierarchical taxonomy may include multiple levels arranged in order of increasing specificity and each level of the hierarchical taxonomy may include one or more topics with which a content item may be associated. Each topic within a hierarchical taxonomy may include a set of more specific subtopics within a more specific level of the hierarchical taxonomy. Once the online system 140 has generated 312 a hierarchical taxonomy, the online system 140 subsequently may add more topics/nodes to the hierarchical taxonomy. For example, upon receiving 300 one or more content items associated with topics that are related to, but not included in a hierarchical taxonomy, the online system 140 may add a node corresponding to each topic to one or more levels of the hierarchical taxonomy.

Figure 4A:
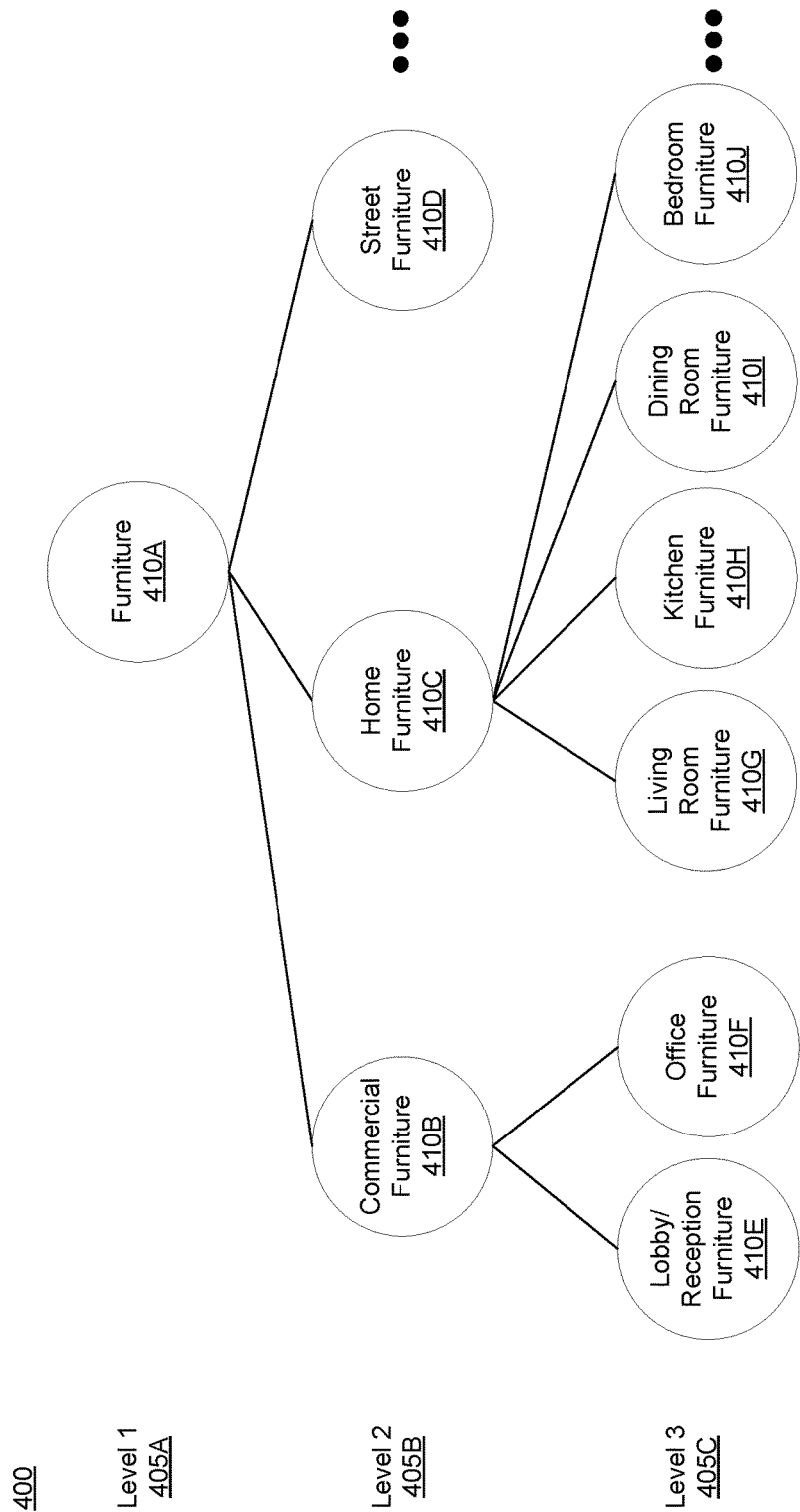
FIG. 4A is an example hierarchical taxonomy that may be generated by the online system, in accordance with an embodiment.

In some embodiments, a hierarchical taxonomy may be represented as a collection of nodes, in which each topic included in the hierarchical taxonomy corresponds to a node. For example, as illustrated in FIG. 4A, if the online system 140 generates 312 a hierarchical taxonomy 400 based on topics associated with content items maintained in the online system 140 related to furniture, a highest level (Level 1 405A) of the hierarchical taxonomy 400 may include a node 410A corresponding to a broadest topic that may be associated with the content items (e.g., furniture). In this example, the broadest topic may include a set of subtopics corresponding to nodes 410B-D within a lower level of the hierarchical taxonomy (Level 2 405B), in which each subtopic may be associated with a more specific type of furniture (e.g., commercial furniture, home furniture, street furniture, etc.). Continuing with this example, each subtopic also may include a set of even more specific subtopics corresponding to nodes 410E-J within an even lower level of the hierarchical taxonomy (Level 3 405C), in which each subtopic may be associated with even more specific types of furniture (e.g., types of commercial furniture, types of home furniture, types of street furniture, etc.).

Referring back to FIG. 3, the online system 140 presents 314 one or more content items maintained in the online system 140 to viewing users of the online system 140. For example, upon identifying an opportunity to present 314 content to a viewing user of the online system 140, the online system 140 may send one or more content items to a client device 110 associated with the viewing user. In this example, once the content items are received at the client device 110, the content items may be presented 314 to the viewing user in a display area of the client device 110.

Once the online system 140 has presented (in step 314) content items to users of the online system 140, the online system 140 subsequently may communicate 316 a request to these users for information indicating the users' familiarity with the content items. For example, for each user of the online system 140 to whom a content item was presented 314, the online system 140 may communicate 316 a questionnaire or a survey to the user one week later. In this example, the questionnaire or survey may ask the user whether they recall being presented 314 with the content item one week ago and whether the user recalls various details associated with the content item (e.g., its content, a call to action associated with the content item, etc.).

The online system 140 then receives 318 (e.g., using the action logger 215) information associated with each presentation of a content item to an online system user. Information associated with the presentation of a content item to an online system user may describe a type of interaction with the content item by the user (e.g., clicking on the content item, sharing the content item with additional online system users, expressing a preference for the content item, commenting on the content item, etc.), attributes for the user (e.g., demographic information, hobbies/interests, or any other types of information stored in association with a user profile of the user), one or more topics associated with the content item, a date/time of the presentation, etc. For example, upon presenting 314 a content item to a user of the online system 140, the online system 140 may receive 318 information indicating that the user clicked on the content item, user-identifying information for the user (e.g., a username or an IP address associated with the user), information identifying the content item (e.g., an identification number or other unique identifier associated with the content item), and a date and a time that the user clicked on the content item. The information received 318 by the online system 140 associated with the presentation of a content item to an online system user also may include information indicating the user's familiarity with the content item. For example, the online system 140 may receive (in step 318) responses to questionnaires or surveys from one or more of the users of the online system 140 indicating whether the users recalled being presented 314 with various content items previously presented 314 to the users and whether the users recalled various details associated with the content items.

Once the online system 140 has received 318 information associated with each presentation of a content item to an online system user, the online system 140 may store 320 this information (e.g., in the action log 220). For example, suppose that in response to presenting 314 a content item to a user of the online system 140, the online system 140 receives 318 information indicating that the user commented on a content item, a username associated with the user, an identification number associated with the content item, and a date and a time that the user commented on the content item. In this example, the online system 140 may retrieve one or more topics associated with the content item based on the identification number associated with the content item and one or more attributes for the user based on the username associated with the user. Continuing with this example, the online system 140 may store 320 the information indicating that the user commented on the content item, the username associated with the user, the identification number associated with the content item, and the date and the time that the user commented on the content item in association with the topics associated with the content item and the attributes for the user (e.g., as a record in a table) in the action log 220. In some embodiments, the information stored 320 by the online system 140 also may include information indicating an online system user's familiarity with a content item. In the above example, upon receiving 318 information indicating the user's familiarity with the content item one week after the content item was presented 314 to the user, the online system 140 may store 320 this information in the action log 220 as well (e.g., by adding it to the record in the table).

In some embodiments, the online system 140 may train 322 (e.g., using the familiarity prediction module 245) a machine-learning model to predict likelihoods that users of the online system 140 are familiar with information associated with various content items. In such embodiments, the online system 140 may train 322 the machine-learning model using at least some of the information associated with the presentation of content items to various online system users. For example, the online system 140 may identify information stored in the action log 220 describing each presentation of a content item to a user of the online system 140, in which the online system 140 later received 318 information indicating the user's familiarity with the content item. In this example, the online system 140 may train 322 a model based on the identified information (e.g., information describing each user's interaction with the content item, one or more topics associated with the content item, attributes for the user, information indicating the user's familiarity with the content item, and a difference between the time of the interaction and the time that the online system 140 received 318 the information indicating the user's familiarity with the content item).

The online system 140 then predicts 324 (e.g., using the familiarity prediction module 245) a likelihood that a user of the online system 140 is familiar with information associated with one or more content items associated with a particular topic within a hierarchical taxonomy generated 312 by the online system 140. The online system 140 may make the prediction that the user is familiar with information associated with each content item associated with the topic based on information associated with the presentation of the same or similar content items to various online system users and on attributes for these additional users. In embodiments in which the online system 140 trains 322 a model to predict (in step 324) likelihoods that users of the online system 140 are familiar with information associated with various content items, the online system 140 may use the model to predict 324 the likelihood. For example, the online system 140 may identify online system users who were presented 314 with a content item, but from whom the online system 140 did not subsequently receive 318 information indicating their familiarity with the content item and use a model to predict (in step 324) likelihoods that the users are familiar with information associated with this content item (e.g., by providing attributes for the users and the times at which the content item was presented 314 to the users as inputs to the model). In the above example, the online system 140 also may use the model to predict (in step 324) likelihoods that the users are familiar with information associated with similar content items (e.g., content items associated with the same topics).

In some embodiments, for each content item associated with the topic for which the online system 140 has predicted 324 a likelihood that the user of the online system 140 is familiar with information associated with the content item, the online system 140 may predict 326 (e.g., using the accuracy prediction module 250) an accuracy of the assignment of the topic to the content item. The online system 140 may predict 326 the accuracy of the assignment of the topic to each content item based on the manner in which the topic was assigned to the content item. For example, the online system 140 may predict 326 that assignments of topics to content items by a content-providing user from whom the content items were received 300 have greater accuracies than topics assigned 308 to content items by a machine-learning model. As an additional example, in embodiments in which a topic is assigned 308 to a content item by a machine-learning model, the online system 140 also may predict 326 an accuracy of the assignment (e.g., based on the size of a training data set used to train 306 the model, based on an amount of information associated with the content item, and/or based on the type of information associated with the content item used as an input to the model, etc.).

The online system 140 also may determine (in step 328, e.g., using the topic relationship module 255) relationships between the topic and one or more additional topics to which the user is connected. In some embodiments, the online system 140 may determine (in step 328) relationships between the topic and additional topics to which the user is connected by accessing a hierarchical taxonomy. In such embodiments, the online system 140 may identify a node in the hierarchical taxonomy corresponding to the topic and determine a number of nodes that must be traversed from this node to reach each node corresponding to each additional topic to which the user is connected. The online system 140 may then determine 328 that a closeness of a relationship between the topic and each additional topic to which the user is connected is inversely proportional to the number of nodes that must be traversed. For example, if a user of the online system 140 is connected to the topic of candy, the online system 140 may determine 328 a relationship between an additional topic and the topic of candy. In this example, if the additional topic is cakes, the online system 140 may determine 328 a relationship between the topic of candy and the topic of cakes is inversely proportional to the number of nodes in a hierarchical taxonomy that must be traversed from a node corresponding to the topic of candy to a node corresponding to the topic of cakes. Continuing with this example, if nodes corresponding to the topics of cakes and candy are both directly connected to a node corresponding to the topic of sweets, the online system 140 may determine 328 that there is a close relationship between the topic of candy and cakes. In the above example, if the additional topic is a particular restaurant and nodes in the hierarchical taxonomy corresponding to the topics of candy and the restaurant are both indirectly connected to a node corresponding to the topic of food, the online system 140 may determine 328 that there is a relationship between the topic of candy and the topic of the particular restaurant, but that the relationship is not as close as the relationship between the topics of candy and cakes.

The online system 140 then determines 330 (e.g., using the weight determination module 260) a weight of a connection to be established between the user of the online system 140 and the topic. In some embodiments, the weight of the connection may correspond to a predicted level of knowledge that the user has about the topic. For example, the weight of a connection to be established between a user of the online system 140 and a topic of knitting associated with various content items maintained in the online system 140 may be proportional to a predicted level of knowledge that the user has about knitting. In some embodiments, the weight of the connection may be represented as a numerical value, in which a higher value corresponds to a higher predicted level of knowledge and a lower value corresponds to a lower predicted level of knowledge. For example, a weight of a connection to be established between a user and a topic may range from 0 to 1, in which a value of 0 indicates that the user is predicted to have no knowledge about the topic and a value of 1 indicates that the user is an expert in the topic.

The online system 140 may determine 330 the weight of the connection based at least in part on the predicted likelihood that the user is familiar with information associated with one or more content items associated with the topic. For example, once the online system 140 has predicted 324 a likelihood that a user of the online system 140 is familiar with information associated with a content item associated with a topic, the online system 140 may determine 330 a weight of a connection to be established between the user and the topic that is proportional to the predicted likelihood. As an additional example, once the online system 140 has predicted 324 a likelihood that a user is familiar with information associated with each of multiple content items associated with a topic, the online system 140 may determine 330 a weight of a connection to be established between the user and the topic that is proportional to an average of the predicted likelihoods.

The online system 140 also may determine 330 the weight of the connection to be established between the user and the topic based at least in part on a predicted accuracy of an assignment of the topic to the one or more content items. For example, the online system 140 may obtain a value by discounting a predicted likelihood that a user of the online system 140 is familiar with information associated with a content item associated with a topic by an amount that is inversely proportional to a predicted accuracy of the assignment of the topic to the content item. In this example, the online system 140 may determine 330 a weight of a connection to be established between the user and the topic that is equal to or proportional to the obtained value. In the above example, if the topic is associated with multiple content items, the online system 140 also may obtain the value by discounting the predicted likelihood by an amount that is inversely proportional to an average of the predicted accuracies of the assignment of the topic to the content items.

In some embodiments, the online system 140 also may determine 330 the weight of the connection to be established between the user and the topic based on relationships between the topic and one or more additional topics to which the user is connected. For example, if a user of the online system 140 is connected to topics associated with art (e.g., paintings, sculptures, etc.), the online system 140 may determine 330 a weight of a connection to be established between the user and an additional topic based on a relationship between the topic and the topic of art. In this example, if the additional topic is related to art (e.g., a name of a painter), the online system 140 may discount the predicted likelihood that the user is familiar with information associated with content items associated with the additional topic by a smaller value than if the additional topic were unrelated to the topic of art or other topics to which the user is connected. Continuing with this example, the online system 140 may determine 330 the weight of a connection to be established between the user and the additional topic to be proportional to the discounted likelihood.

Once the online system 140 has determined 330 the weight of the connection to be established between the user and the topic associated with the content items, the online system 140 then generates 332 (e.g., using the edge generator 265) the connection between the user and the topic, in which the connection has a weight corresponding to a predicted level of knowledge that the user has about the topic. For example, once the online system 140 has determined 330 a weight of a connection to be established between a user and a topic of photography, the online system 140 may generate 332 a connection between the user and the topic. In this example, the weight of the connection is proportional to the user's predicted level of knowledge about the topic of photography, such that the connection has a greater weight if the user is predicted to be an expert photographer than if the user is predicted to be a novice photographer.

In some embodiments, the online system 140 may generate 332 the connection between the user and the topic by identifying a node in a hierarchical taxonomy corresponding to the topic and generating 332 an edge between a node corresponding to the user and the node corresponding to the topic. For example, the online system 140 may access a hierarchical taxonomy generated 312 by the online system 140 and identify a node within the hierarchical taxonomy corresponding to a topic for which the online system 140 has determined 330 a weight of a connection to be established between a user of the online system 140 and the topic. In this example, the online system 140 may generate 332 a node corresponding to the user, as well as an edge between the node corresponding to the user and the node corresponding to the topic, in which the edge corresponds to a connection between the user and the topic and has the weight determined 330 by the online system 140.

Figure 4B:
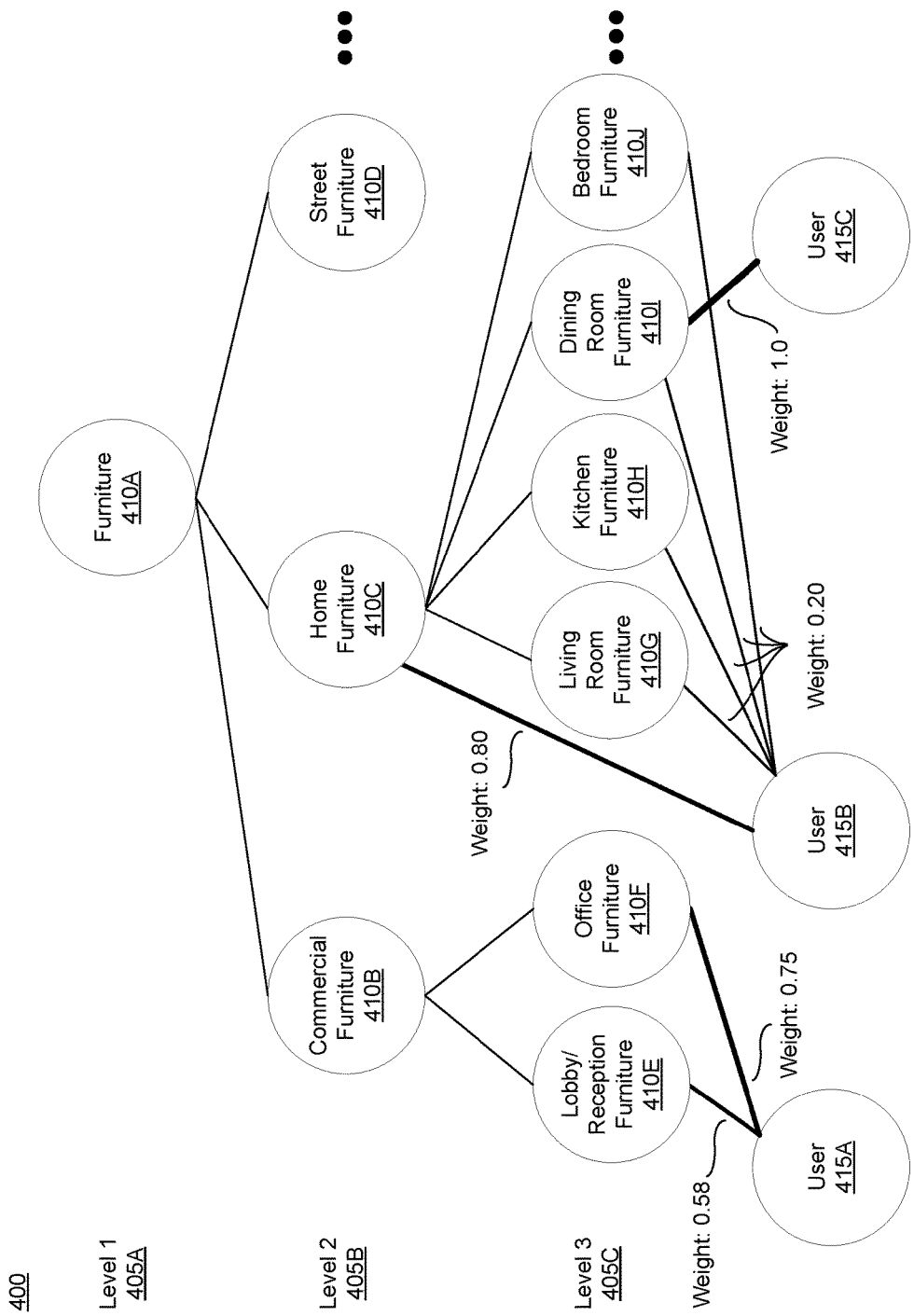
FIG. 4B is an example hierarchical taxonomy indicating predicted levels of knowledge that users of the online system have about one or more topics associated with one or more content items maintained in the online system, in accordance with an embodiment.

For example, as illustrated in FIG. 4B, suppose that the online system 140 has determined 330 that a weight of a connection to be established between a user of the online system 140 and the topic of lobby/reception furniture is 0.58 and a weight of a connection to be established between the user and the topic of office furniture is 0.75. In this example, the online system 140 may generate 332 an edge in a hierarchical taxonomy 400 between a node 415A corresponding to the user and a node 410E corresponding to the topic of lobby/reception furniture having a weight of 0.58. Similarly, the online system 140 may generate 332 an edge between the node 415A corresponding to the user and a node 410F corresponding to the topic of office furniture having a weight of 0.75. As an additional example, suppose that the online system 140 has determined 330 that a weight of a connection to be established between a user of the online system 140 and the topic of dining room furniture is 1.0. In this example, the online system 140 may generate 332 an edge in the hierarchical taxonomy 400 between a node 415C corresponding to the user and a node 410I corresponding to the topic of dining room furniture having a weight of 1.0.

In some embodiments, the online system 140 may generate (in step 332) edges between nodes corresponding to users and nodes corresponding to topics included in multiple levels of a hierarchical taxonomy. For example, as illustrated in FIG. 4B, suppose that the online system 140 has generated (in step 332) edges in the hierarchical taxonomy 400 between a node 415B corresponding to a user and nodes 410G-J included in the same level (Level 3 405C) of the hierarchical taxonomy 400 corresponding to the topics of living room furniture, kitchen furniture, dining room furniture, and bedroom furniture. In this example, suppose also that the weight of each of the connections between the node 415B corresponding to the user and the nodes 410G-J corresponding to the topics of living room furniture, kitchen furniture, dining room furniture, and bedroom furniture is 0.2. Continuing with this example, the online system 140 also may generate 332 an edge between the node 415B corresponding to the user and an additional node 410C corresponding to the broader topic of home furniture, which is included in a different level (Level 2 405B) of the hierarchical taxonomy 400 and includes the subtopics corresponding to nodes 410G-J.

Referring back to FIG. 3, once the online system 140 has generated 332 a connection between the user and the topic, the online system 140 may identify 334 an opportunity to present content to the user. For example, the online system 140 may identify 334 an opportunity to present content to a viewing user of the online system 140 upon receiving a request from the viewing user to access a user profile page associated with the viewing user, in which the user profile page includes a newsfeed in which various content items may be presented. As an additional example, the online system 140 may identify 334 an opportunity to present content to a viewing user of the online system 140 upon receiving a request to present a web page maintained in the online system 140 to the viewing user, in which the web page includes a scrollable unit in which advertisements and other types of content items may be presented.

Upon identifying 334 an opportunity to present content to the user, the online system 140 may retrieve 336 information indicating the user's predicted level of knowledge about the topic. For example, the online system 140 may identify nodes corresponding to a user and a topic within a hierarchical taxonomy and access information stored in association with an edge between the nodes corresponding to a connection between the user and the topic. In this example, based on information stored in association with the edge indicating the weight of the connection, the online system 140 may retrieve 336 information indicating the user's predicted level of knowledge about the topic.

The online system 140 may then identify 338 (e.g., using the content selection module 270) one or more candidate content items eligible for presentation to the user based at least in part on the user's predicted level of knowledge about the topic. In some embodiments, the online system 140 also may take into account additional factors when identifying (in step 338) candidate content items eligible for presentation to the user (e.g., targeting criteria). For example, upon identifying 334 an opportunity to present content to a viewing user of the online system 140, if targeting criteria associated with a content item related to the topic of skiing identify online system users who have an interest in skiing as eligible to be presented with the content item, the online system 140 may access the edge store 225 and retrieve 336 information describing an edge/connection between the viewing user and the topic of skiing. In this example, the online system 140 may identify 338 the content item as a candidate content item that is eligible for presentation to the viewing user if a weight of the connection indicates that the viewing user has at least a threshold predicted level of knowledge about skiing and therefore likely has an interest in skiing. As an additional example, the online system 140 may compare a viewing user's predicted level of knowledge about a topic to a threshold level of knowledge and identify 338 a candidate content item associated with the topic that is eligible for presentation to the viewing user based on the comparison. In this example, the online system 140 may identify 338 a direct response advertisement as being eligible for presentation to the viewing user if the viewing user's predicted level of knowledge about the topic is at least the threshold level. Alternatively, in this example, the online system 140 may identify 338 a different type of advertisement as being eligible for presentation to the viewing user if the viewing user's predicted level of knowledge about the topic is less than the threshold level.

The online system 140 may then select 340 (e.g., using the content selection module 270) one or more candidate content items for presentation to the user. In some embodiments, the online system 140 may rank candidate content items based at least in part on a value associated with each candidate content item and select 340 one or more candidate content items having the highest values for presentation to the user. In various embodiments, a value associated with a candidate content item may correspond to information indicating the user's predicted level of knowledge about a topic. For example, the online system 140 may rank candidate content items eligible to be presented to a viewing user of the online system 140 based on the viewing user's predicted level of knowledge about topics associated with the candidate content items. In this example, the online system 140 may assign a higher rank to candidate content items associated with topics for which the viewing user has a higher predicted level of knowledge than to candidate content items associated with topics for which the viewing user has a lower predicted level of knowledge. Continuing with this example, the online system 140 may select 340 one or more of the highest ranked candidate content items for presentation to the viewing user.

In some embodiments, a value associated with a candidate content item also may correspond to a score computed by the online system 140 that indicates a predicted affinity of the user for the candidate content item, a bid amount, or any other suitable value that may be associated with a content item. For example, the online system 140 may rank a set of candidate content items based at least in part on a bid amount associated with each candidate content item. In this example, the online system 140 may then select 340 one or more of the candidate content items for presentation to a viewing user of the online system 140 based at least in part on the ranking. In the above example, the online system 140 also may compute an affinity score for each candidate content item that indicates a predicted affinity of the viewing user for the candidate content item. Continuing with this example, the online system 140 may then rank the candidate content items based at least in part on the bid amount and/or on the affinity score associated with each candidate content item and select 340 one or more of the candidate content items for presentation to the viewing user based at least in part on the ranking.

In embodiments in which the online system 140 selects 340 multiple content items for presentation to the user based at least in part on a ranking of the content items, the content items may be arranged in a user interface that is presented to the user based at least in part on the ranking. For example, suppose that multiple content items are selected 340 for presentation to a viewing user of the online system 140 and the selected content items are to be included in a feed of content items (e.g., a newsfeed). In this example, the content items may be arranged based at least in part on the ranking, such that higher ranked content items are presented in more prominent positions in the feed than lower ranked content items.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining, at an online system, a plurality of content items, each of the plurality of content items associated with one or more of a plurality of topics;
generating a hierarchical taxonomy based at least in part on the plurality of topics, the hierarchical taxonomy comprising a plurality of levels arranged in order of increasing specificity, each level of the plurality of levels comprising a set of the plurality of topics;
receiving a set of information associated with presentations of the plurality of content items to a plurality of users of the online system, wherein the set of information indicates a familiarity of each of a set of the plurality of users with a set of the plurality of content items and each of the plurality of users is associated with one or more attributes;
for a user of the online system:
predicting a likelihood that the user is familiar with information associated with one or more content items maintained in the online system based at least in part on the received set of information and a set of attributes associated with the user, wherein the one or more content items are associated with a topic within the hierarchical taxonomy;
determining a weight of a connection between the user and the topic based at least in part on the predicted likelihood, wherein the weight corresponds to a predicted level of knowledge that the user has about the topic; and generating the connection between the user and the topic, the connection having the determined weight.

2. The method of claim 1, wherein the one or more of the plurality of topics associated with each of the plurality of content items are assigned to each of the plurality of content items.

3. The method of claim 2, wherein the one or more of the plurality of topics are assigned to each of the plurality of content items by one or more of: a machine-learning model and one or more content-providing users of the online system associated with one or more of the plurality of content items.

4. The method of claim 2, wherein determining the weight of the connection between the user and the topic is further based at least in part on a predicted accuracy of an assignment of the topic associated with the one or more content items.

5. The method of claim 4, wherein determining the weight of the connection between the user and the topic comprises:

discounting the predicted likelihood that the user is familiar with the information associated with the one or more content items by the predicted accuracy of the assignment of the topic associated with the one or more content items.

6. The method of claim 1, further comprising:

receiving the one or more content items associated with the topic; and adding the topic to a level of the hierarchical taxonomy.

7. The method of claim 6, wherein determining the weight of the connection between the user and the topic further comprises:

discounting the predicted likelihood that the user is familiar with the information associated with the one or more content items by an amount based at least in part on a relationship between the topic and each of one or more additional topics within the hierarchical taxonomy to which the user is connected.

8. The method of claim 1, further comprising:

predicting an additional likelihood that the user has an interest in the topic based at least in part on the weight of the connection between the user and the topic.

9. The method of claim 1, further comprising:

identifying an opportunity to present content to the user; and selecting a content item associated with the topic for presentation to the user based at least in part on the weight of the connection between the user and the topic.

10. The method of claim 9, wherein selecting the content item associated with the topic for presentation to the user based at least in part on the weight of the connection between the user and the topic comprises:

selecting a first type of content item associated with the topic for presentation to the user if the weight of the connection between the user and the topic corresponds to at least a threshold predicted level of knowledge that the user has about the topic; and selecting a second type of content item associated with the topic for presentation to the user if the weight of the connection between the user and the topic corresponds to less than the threshold predicted level of knowledge that the user has about the topic.

11. The method of claim 9, wherein selecting a content item for presentation to the user based at least in part on the weight of the connection between the user and the topic comprises:

ranking the content item among a set of content items based at least in part on the weight of the connection between the user and the topic.

12. The method of claim 1, wherein the received set of information indicates one or more of: whether the set of users recall being presented with the set of the plurality of content items and whether the set of users recall a content of each of the set of the plurality of content items.

13. A computer program product comprising a non-transitory, tangible computer readable storage medium having instructions encoded thereon that, when executed by a processor, cause the processor to:

maintain, at an online system, a plurality of content items, each of the plurality of content items associated with one or more of a plurality of topics;

generate a hierarchical taxonomy based at least in part on the plurality of topics, the hierarchical taxonomy comprising a plurality of levels arranged in order of increasing specificity, each level of the plurality of levels comprising a set of the plurality of topics;

receive a set of information associated with presentations of the plurality of content items to a plurality of users of the online system, wherein the set of information indicates a familiarity of each of a set of the plurality of users with a set of the plurality of content items and each of the plurality of users is associated with one or more attributes;

for a user of the online system:

predict a likelihood that the user is familiar with information associated with one or more content items maintained in the online system based at least in part on the received set of information and a set of attributes associated with the user, wherein the one or more content items are associated with a topic within the hierarchical taxonomy;

determine a weight of a connection between the user and the topic based at least in part on the predicted likelihood, wherein the weight corresponds to a predicted level of knowledge that the user has about the topic; and generate the connection between the user and the topic, the connection having the determined weight.

14. The computer program product of claim 13, wherein the one or more of the plurality of topics associated with each of the plurality of content items are assigned to each of the plurality of content items.

15. The computer program product of claim 14, wherein the one or more of the plurality of topics are assigned to each of the plurality of content items by one or more of: a machine-learning model and one or more content-providing users of the online system associated with one or more of the plurality of content items.

16. The computer program product of claim 14, wherein determine the weight of the connection between the user and the topic is further based at least in part on a predicted accuracy of an assignment of the topic associated with the one or more content items.

17. The computer program product of claim 16, wherein determine the weight of the connection between the user and the topic comprises:

discount the predicted likelihood that the user is familiar with the information associated with the one or more content items by the predicted accuracy of the assignment of the topic associated with the one or more content items.

18. The computer program product of claim 13, wherein the computer readable storage medium further has instructions encoded thereon that, when executed by the processor, cause the processor to:
receive the one or more content items associated with the topic; and
add the topic to a level of the hierarchical taxonomy.

19. The computer program product of claim 18, wherein determine the weight of the connection between the user and the topic further comprises:
discount the predicted likelihood that the user is familiar with the information associated with the one or more content items by an amount based at least in part on a relationship between the topic and each of one or more additional topics within the hierarchical taxonomy to which the user is connected.

20. The computer program product of claim 13, wherein the computer readable storage medium further has instructions encoded thereon that, when executed by the processor, cause the processor to:
predict an additional likelihood that the user has an interest in the topic based at least in part on the weight of the connection between the user and the topic.

21. The computer program product of claim 13, wherein the computer readable storage medium further has instructions encoded thereon that, when executed by the processor, cause the processor to:
identify an opportunity to present content to the user; and
select a content item associated with the topic for presentation to the user based at least in part on the weight of the connection between the user and the topic.

22. The computer program product of claim 21, wherein select the content item associated with the topic for presentation to the user based at least in part on the weight of the connection between the user and the topic comprises:
select a first type of content item associated with the topic for presentation to the user if the weight of the connection between the user and the topic corresponds to at least a threshold predicted level of knowledge that the user has about the topic; and
select a second type of content item associated with the topic for presentation to the user if the weight of the connection between the user and the topic corresponds to less than the threshold predicted level of knowledge that the user has about the topic.

23. The computer program product of claim 21, wherein select a content item for presentation to the user based at least in part on the weight of the connection between the user and the topic comprises:
rank the content item among a set of content items based at least in part on the weight of the connection between the user and the topic.

24. The computer program product of claim 13, wherein the received set of information indicates one or more of: whether the set of users recall being presented with the set of the plurality of content items and whether the set of users recall a content of each of the set of the plurality of content items.

25. A method comprising:
maintaining, at an online system, a plurality of content items, each content item of the plurality of content items associated with one or more of a plurality of topics assigned to the content item;
generating a hierarchical taxonomy based at least in part on the plurality of topics, the hierarchical taxonomy comprising a plurality of levels arranged in order of increasing specificity, each level of the plurality of levels comprising a set of nodes, wherein each of the set of nodes corresponds to each of the plurality of topics;
receiving a set of information associated with presentations of the plurality of content items to a plurality of users of the online system, wherein the set of information indicates a familiarity of each of a set of the plurality of users with a set of the plurality of content items and each of the plurality of users is associated with one or more attributes;
for a user of the online system:
predicting a likelihood that the user is familiar with information associated with one or more content items maintained in the online system based at least in part on the received set of information and a set of attributes associated with the user, wherein the one or more content items are associated with a topic corresponding to a node of the hierarchical taxonomy;
predicting a level of knowledge that the user has about the topic based at least in part on the predicted likelihood; and
generating an edge between the node and an additional node corresponding to the user, the edge indicating the predicted level of knowledge.

* * * * *